Feb. 16, 1954
J. C. YOUNG
2,669,358
STRAINER FOR DOWNSPOUT DRAINS
Filed Jan. 5, 1950
4 Sheets-Sheet 1
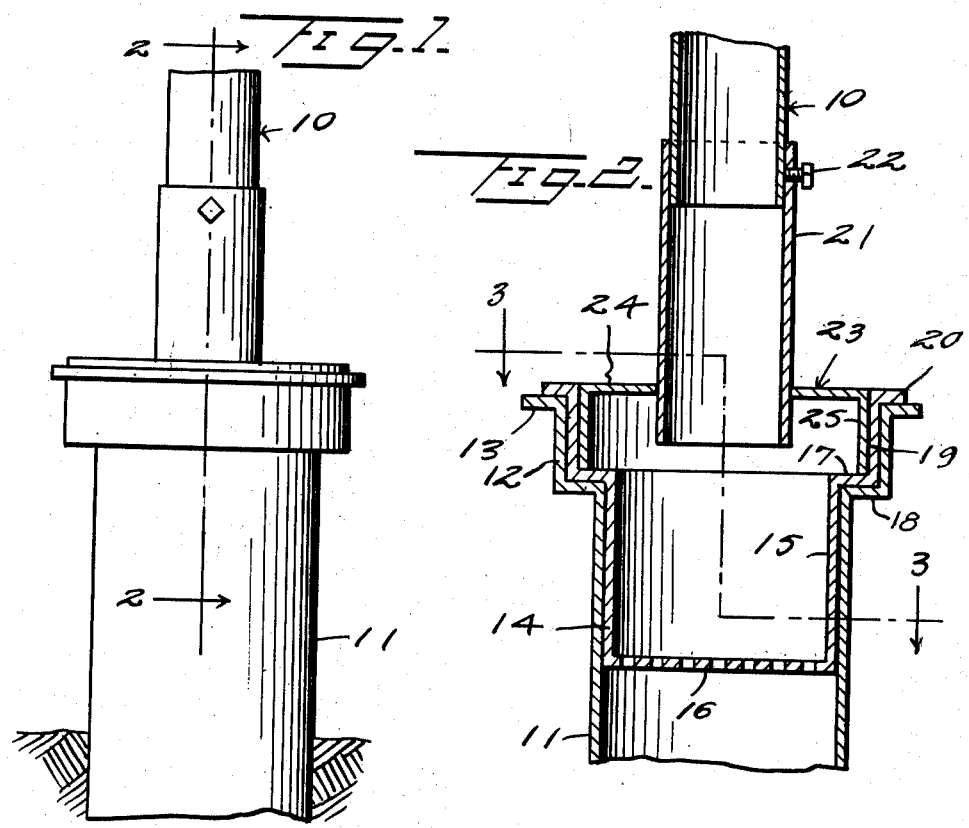
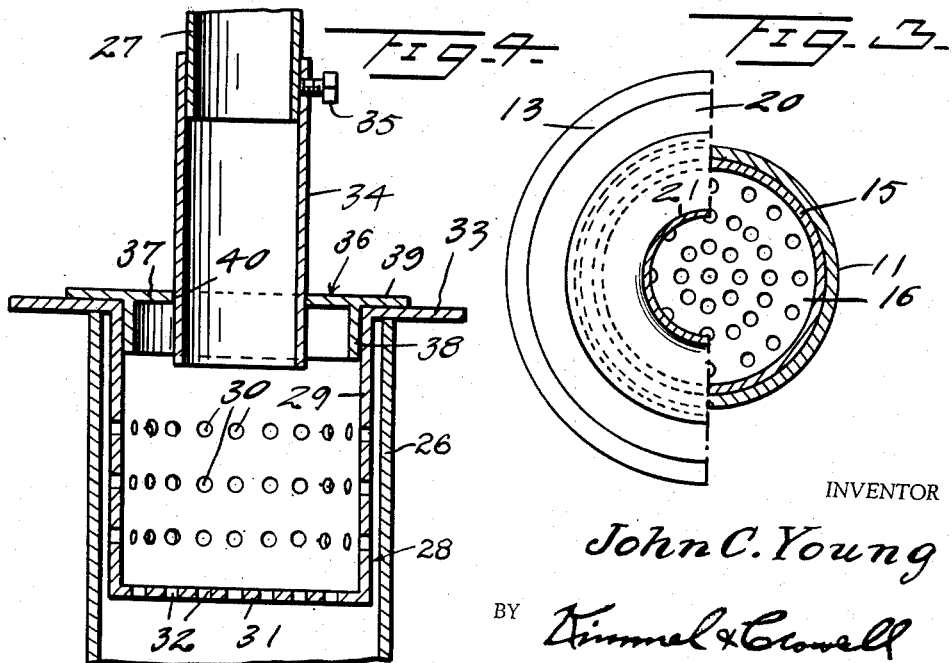
INVENTOR
John C. Young
BY Kimmel & Crowell
ATTORNEYS Feb. 16, 1954
J. C. YOUNG
2,669,358
STRAINER FOR DOWNSPOUT DRAINS
Filed Jan. 5, 1950
4 Sheets-Sheet 2
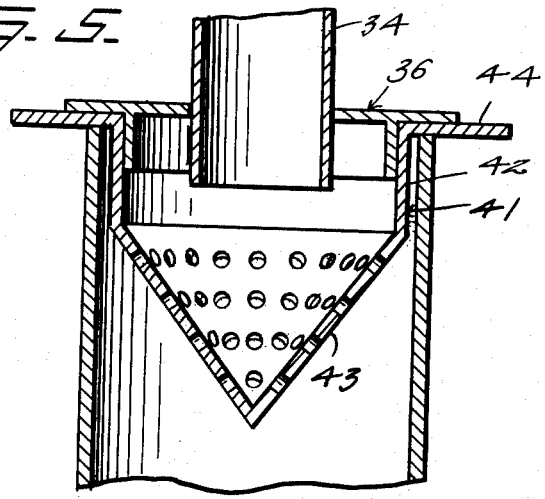
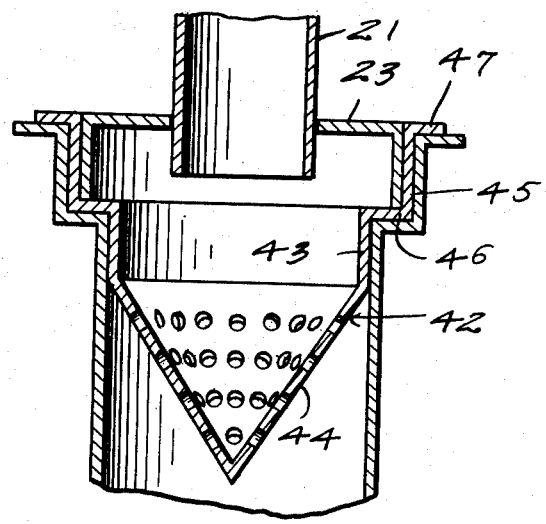
INVENTOR.
John C. Young
BY
Kimmel & Crowell Attys.

Feb. 16, 1954  J. C. YOUNG  2,669,358
STRAINER FOR DOWNSPOUT DRAINS
Filed Jan. 5, 1950  4 Sheets-Sheet 3
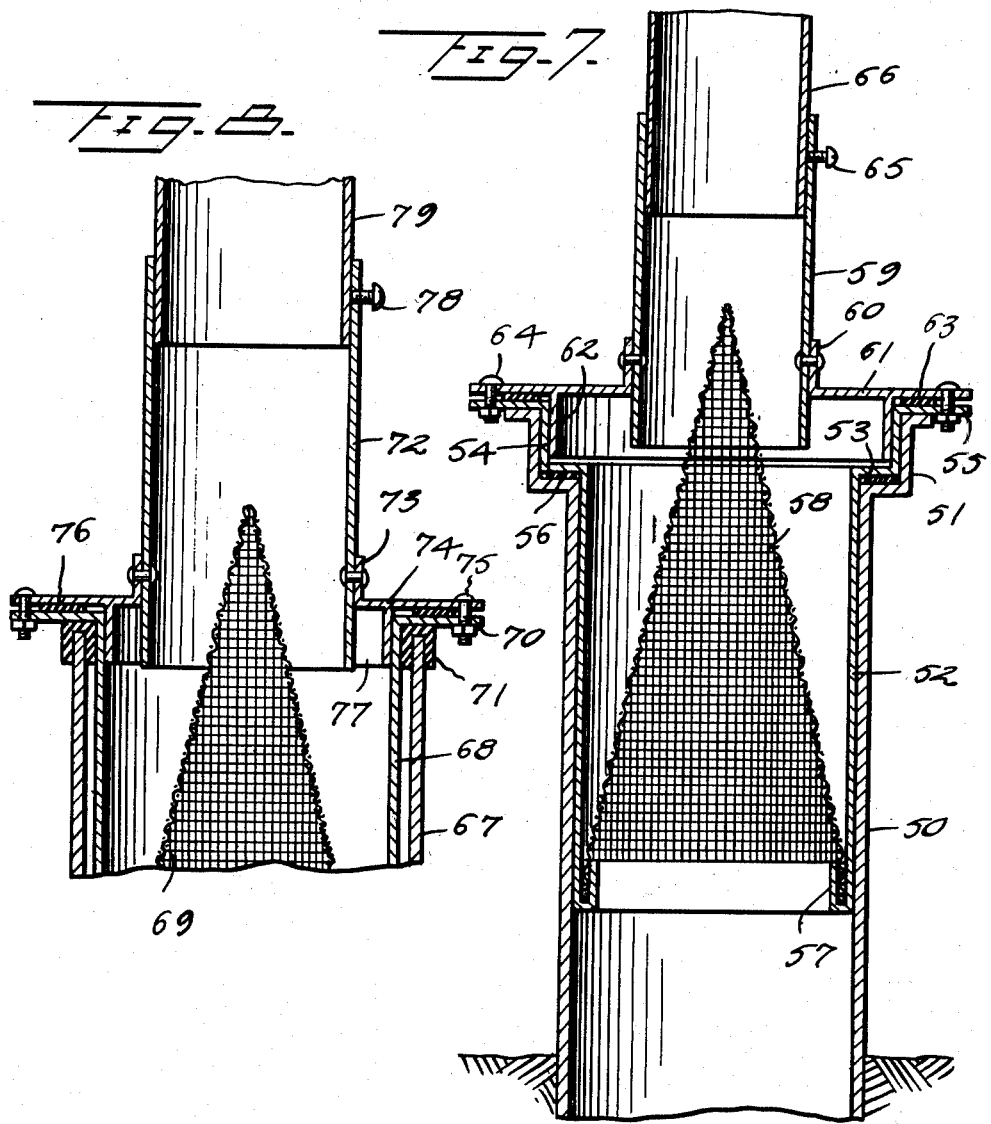
INVENTOR
John C. Young
BY Kimmel & Crowell
ATTORNEYS Feb. 16, 1954    J. C. YOUNG    2,669,358
STRAINER FOR DOWNSPOUT DRAINS
Filed Jan. 5, 1950    4 Sheets-Sheet 4
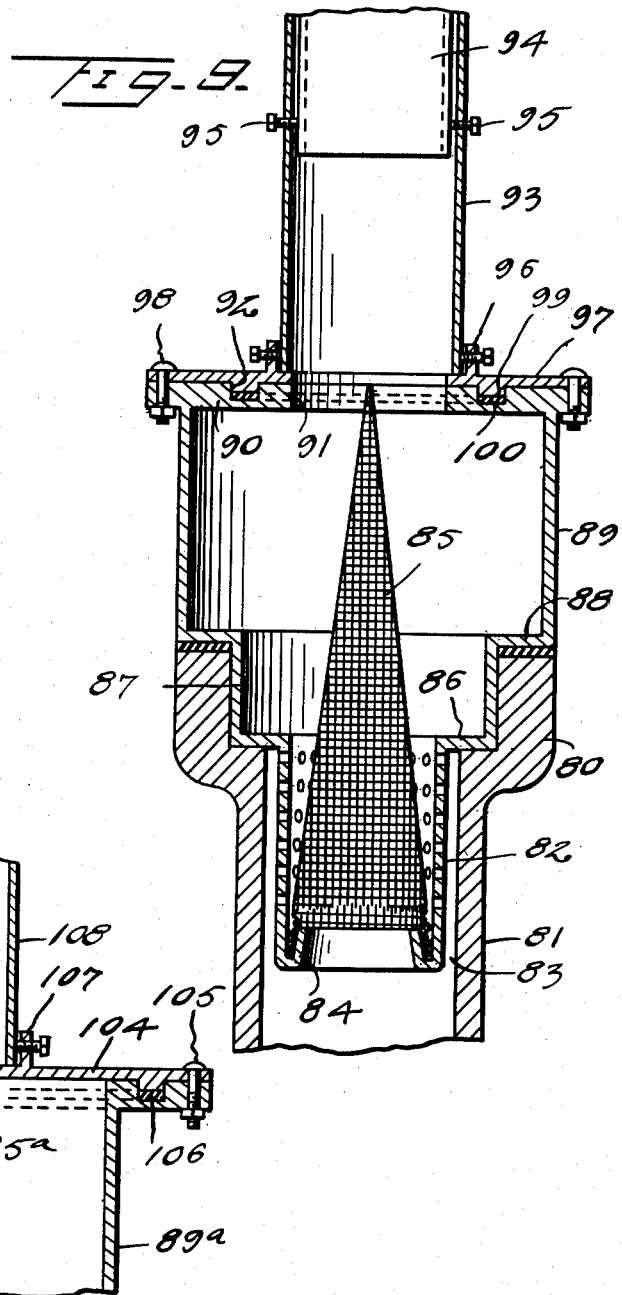
INVENTOR
John C. Young
BY Kimmel + Crowell
ATTORNEYS Patented Feb. 16, 1954

2,669,358

UNITED STATES PATENT OFFICE 2,669,358

STRAINER FOR DOWNSPOUT DRAINS

John C. Young, Pittsburgh, Pa.

Application January 5, 1950, Serial No. 136,945

2 Claims. (Cl. 210—88)

This invention relates to a strainer for down spouts and is an improvement over the structure embodied in my prior Patent No. 2,446,256, issued August 3, 1948.

An object of this invention is to provide an improved down spout strainer which is mounted in the upper end of a soil pipe, the strainer including means whereby the down spout may be connected with the soil pipe irrespective of the difference in diameter between the down spout and the soil pipe.

Another object of this invention is to provide a strainer of this kind which includes means whereby the down spout may be uncoupled from the strainer and soil pipe so that the strainer may be cleaned.

A further object of this invention is to provide a strainer structure which can be mounted on either the flanged upper end of a soil pipe or where the flange of the soil pipe has been removed, a modified form of this strainer structure is adapted to be mounted on the cut off soil pipe.

With the above and other objects in view, my invention consists in the arrangement, combination and details of construction disclosed in the drawing and specification, and then more particularly pointed out in the appended claims.

In the drawing:

Figure 1 is a fragmentary side elevation of a down spout and soil pipe having a strainer connected therebetween, constructed according to an embodiment of this invention.

Figure 2 is a fragmentary sectional view taken on the line 2—2 of Figure 1.

Figure 3 is a fragmentary sectional view taken on the line 3—3 of Figure 2.

Figure 4 is a fragmentary vertical section showing a modified form of this invention.

Figure 5 is a fragmentary vertical section showing another modification of this invention.

Figure 6 is a fragmentary vertical section showing a further modification of this invention.

Figure 7 is a vertical section showing another modification of this invention.

Figure 8 is a fragmentary vertical section showing another modification of this invention.

Figure 9 is a vertical section showing another modification of this invention.

Figure 10 is a fragmentary section showing a further modification of this invention.

Referring to the drawing, the numeral 10 designates generally a down spout which is adapted to discharge into a soil pipe 11. The soil pipe 11 is formed at the upper end thereof with an enlarged coupling sleeve 12 terminating at the upper end thereof in an annular flange 13.

A strainer structure generally designated as 14 is suspendingly mounted in the upper end of the soil pipe 11, and comprises a cylindrical body 15 which is formed with a perforated bottom wall 16.

The upper portion of the body 15 is formed with an annular flange 17 adapted to seat on the shoulder 18 formed by the enlarged coupling member 12. A cylindrical upwardly projecting flange 19 projects from the horizontal flange 17, and an upper annular flange 20 extends outwardly from the upper end of the cylindrical flange 19. The upper flange 20 is adapted to substantially seat on the flange 13 of the soil pipe 11.

As shown in Figure 2, the down spout 10 terminates at a point slightly above the upper end of the soil pipe 11, and in order that the water or other liquids will drain into the soil pipe 11, I have provided a cylindrical sleeve 21 which is secured by fastening means 22 to the lower end of the down spout 10. The sleeve 21 telescopes over the lower end of the down spout 10 and terminates at a point axially within the upper portion of the soil pipe 11.

An inverted cup-shaped member 23 is disposed loosely about the sleeve 21 and comprises a top wall 24 having a cylindrical side wall 25 loosely engaging within the cylindrical flange 19. The lower end of the side wall 25 is adapted to rest on the annular flange 17. The cup-shaped member 23 provides a means for concentrically holding the sleeve 21 with respect to the coupling member 12 of the soil pipe 11.

Referring now to Figure 4, there is disclosed a soil pipe 26 which is cut off at the upper end thereof and is disposed substantially concentrically beneath a down spout 27. A strainer generally designated as 28 is suspendingly carried by the upper end of the soil pipe 26 and comprises a cylindrical side wall 29 formed with a plurality of openings 30, and a bottom wall 31 formed with a plurality of openings 32. An annular flange 33 of variable width is carried by the upper end of the cylindrical body 29 and engages over the upper cut off end of the soil pipe 26.

A sleeve 34 telescopes over the lower end of the down spout 27, being secured thereto by a set screw 35, and the sleeve 34 extends downwardly into the upper end of the strainer 28. An inverted cup-shaped member 36 is mounted on the upper end of the strainer 28 and comprises a top wall 37 having a cylindrical side wall 38 engaging within the side wall 29. An annular flange 39 extends from the top wall 37 and is adapted to overlie the flange 33. The top wall 37 is formed with a central opening 40 within which the sleeve 34 is adapted to loosely engage.

Referring now to Figure 5 there is disclosed another modification of this invention wherein the strainer 41 is formed of a cylindrical upper part 42, a perforate conical lower part 43 and an upper annular flange 44. The remaining structure, that is, the equalizer 36 and the tube 34 shown in Figure 4 will be used with the strainer 41.

In Figure 6 there is disclosed another modification of this invention which is similar to the form shown in Figure 2. The strainer 42 is formed with a cylindrical intermediate part 43 and with a perforate conical lower part 44. An upper cylindrical part 45 is connected by means of an annulus 46 and is formed at its upper end with an annular flange 47. Equalizer 23 and tube 21 are designed for use with the structure shown in Figure 6 or if desired equalizer 36 and tube 34 may be used therewith.

With a structure as hereinbefore described, the down spout 10 can be connected to or coupled with the soil pipe 11 and the water or liquids flowing downwardly through the down spout 10 will be strained or filtered by the perforate bottom wall 16. With a structure as hereinbefore described, in the event the ground within which the soil pipe 11 is disposed settles so as to lower the soil pipe 11 with respect to the down spout 10, the down spout 10 can nevertheless be connected with the soil pipe through the medium of the vertically adjustable connecting sleeve 21. When it is desired to clean the strainer 14 the sleeve 21 may be loosened and moved upwardly on the down spout 10 so that the cup 23 and the strainer 14 may be removed from the upper end of the soil pipe. The use of different sizes of cups 23 provides an adaptor means which will permit the connection of down spouts of different diameters with the soil pipe.

The structure shown in Figure 4 will be used in the same manner as the structure shown in Figures 1, 2 and 3 and is designed particularly for instances where the coupling portion of the soil pipe is cut off.

Referring now to Figure 7, there is disclosed another modification of this invention wherein the soil pipe 50 which is formed with a cup-shaped connector 51 at its upper end has a strainer mounted therein which includes a cylindrical member 52 projecting downwardly into the pipe 50.

The body 52 is formed at its upper end with an outwardly projecting annular flange 53, and a cylindrical flange 54 projects upwardly from the flange 53. An annular outwardly projecting flange 55 projects from the cylindrical flange 54 and is adapted to engage on the upper end of the connector 51. A sealing gasket 56 is interposed between the flange 53 and the cup-shaped member 51 of the soil pipe.

The lower end of the cylindrical member 52 is formed with an up-turned annular flange 57 within which the lower or base end of a conical screen or strainer 58 is adapted to engage. The conical strainer 58 projects upwardly to a point above the connector 51 and into the lower end of a cylindrical or sleeve connector 59. The connector 59 is secured to a cylindrical flange 60 carried by a plate 61, and the plate 61 is formed with a depending cylindrical flange 62 engaging with the flange 54. A sealing gasket 63 is interposed between the plate 61 and the annular flange 55, and plate 61 is secured to flange 55 by fastening members 64.

The upper end of the sleeve 59 is secured by fastening means 65 to the lower end of a down spout 66.

Referring now to Figure 8 there is disclosed another modification of this invention wherein the soil pipe 67 has the cup-shaped connector cut off therefrom. A cylindrical member 68 similar to cylindrical member 52 projects downwardly into the pipe 67 and is formed at its lower end similar to cylindrical member 52 so as to support a conical strainer member 69. The upper end of the cylindrical member 68 is formed with an annular flange 70 which engages over the upper end of an inverted U-shaped sealing member 71 which encompasses the upper end of the pipe 67.

A sleeve connector 72 is disposed loosely about the upper apex end of the strainer 69 and is secured to an annular flange 73 carried by a plate 74. The plate 74 is secured by fastening means 75 to the flange 70 and a gasket 76 is interposed between plate 74 and flange 70. The plate 74 has an annular centering flange 77 projecting downwardly therefrom and telescoping into the upper end of the cylindrical member 68. The coupling sleeve 72 is adapted to be secured by fastening means 78 to the lower end portion of a downspout 79.

Referring now to Figure 9 there is disclosed another modification of this invention wherein the cup-shaped upper connector end 80 of a soil pipe 81 has a strainer member mounted therein. This strainer member comprises a perforate cylindrical member 82 which is of a diameter substantially less than the inner diameter of pipe 81 so as to form a space 83.

The lower end of the cylindrical member 82 is formed with an upturned flange 84 within which the lower end of a conical strainer 85 is adapted to engage. The upper end of the cylindrical member 82 has formed thereon an annular flange 86 engaging at the bottom of the cup-shaped connector 80, and a cylindrical flange 87 projects upwardly from the flange 86. An annular flange 88 projects outwardly from the upper end of the cylindrical flange 87, and a cylindrical body 89 extends upwardly from the flange 88.

A top wall or plate 90 is fixed on the upper end of the cylindrical body 89 and is formed with a central opening 91 and also with an annular groove or channel 92. A sleeve 93 is adapted to engage loosely about the lower end of a down spout 94 and is secured thereto by fastening members 95. The lower end of the sleeve 93 is secured within an upstanding cylindrical flange 96 which is carried by a plate 97. Plate 97 is secured by fastening members 98 to the upper side of top wall 90, and plate 97 is formed with an annular rib 99 engaging within the groove 92. A sealing gasket 100 is disposed in the bottom of the groove 92 so that plate 97 will be sealed relative to the top wall 90.

Referring now to Figure 10 there is disclosed another modification of this invention wherein the strainer body includes a cylindrical member 89a similar to the body within which the upper apex end of a conical screen 85a is adapted to loosely engage.

The structure of the strainer shown in Figure 10 projecting below the body 89a will be the same as that shown in Figure 9 which projects below the body 89. The body 89a has projecting therefrom an annular flange 101 formed with an annular groove 102 within which the annular rib 103 of a plate 104 is adapted to engage. The plate 104 is secured to the flange 101 by fastening means 105 and a sealing ring 106 is positioned in the bottom of the groove 102.

An upstanding annular flange 107 is carried by the plate 104, and the lower end of a connector sleeve 108 is secured loosely in the flange 107 by fastening means 109.

I do not mean to confine myself to the exact details of construction herein disclosed, but claim all variations falling within the purview of the appended claims.

What I claim is:

1. A strainer for downspouts and soil pipes comprising a cylindrical member adapted to engage in the upper end of a soil pipe, a plate integral with the upper end of said member having a central opening and an annular groove in the upper side thereof, a second plate overlying said first plate having a central opening and an annular rib on the lower side thereof engageable in said groove, means securing said plates together, a coupling sleeve fixed to said second plate and adapted to telescope over the downspout, a conical screen, and means supporting said screen from the lower end of said member.

2. A strainer for downspouts and soil pipes comprising a cylindrical member adapted to engage in the upper end of a soil pipe a plate integral with the upper end of said member having a central opening and an annular groove in the upper side thereof, a second plate overlying said first plate having a central opening and an annular rib on the lower side thereof engageable in said groove, means securing said plates together, a coupling sleeve fixed to said second plate and adapted to telescope over the downspout, a conical screen, and an upturned flange carried by the lower end of said member for engagement within the large base end of said screen.

JOHN C. YOUNG.

References Cited in the file of this patent

UNITED STATES PATENTS

| Number | Name | Date |
|--------|------|------|
| 693,493 | Burger et al. | Feb. 18, 1902 |
| 966,181 | Durbrow | Aug. 2, 1910 |
| 1,020,053 | Ramsey | Mar. 12, 1912 |
| 1,276,271 | Rossignol | Aug. 20, 1918 |
| 1,504,233 | Graham | Aug. 12, 1924 |
| 2,019,094 | Rice et al. | Oct. 29, 1935 |
| 2,446,256 | Young | Aug. 3, 1948 |